3,510,245
pH 3.9 TO 4.4 IMPREGNATION OF AN ACIDIC VEGETABLE TANNED, FAT-LIQUORED LEATHER WITH A DIMETHYLOL UREA SOLUTION
John Wesley Wolfe, Squantum, Mass., assignor to Pers-Pro-Tan Leathers, Inc., Squantum, Mass.
No Drawing. Filed Feb. 13, 1967, Ser. No. 615,378
Int. Cl. C14c 9/02
U.S. Cl. 8—94.21                    2 Claims

ABSTRACT OF THE DISCLOSURE

A method of producing leather from vegetable tanned hides, in which such hides are water washed to remove substantially all uncombined tannins, fat-liquored, dried, and treated with an aqueous solution of dimethylol urea at a pH above 4.4 long enough to allow substantially complete penetration of the hides by the urea. During treatment the pH of the urea is allowed to fall, so that, after substantially complete penetration, the pH is below 4.4 and the penetrated urea becomes affixed to the hides. The hides are then dried, buffed and cut.

This invention relates to a method of producing leather. In particular, the invention relates to a method of producing leather from vegetable tanned hides.

In the conventional process of producing vegetable tanned leather, the hides from the tanning vats are washed with water to remove some of the uncombined tannins, wrung to remove excess water, fat liquored to protect the hides during subsequent processing and to lubricate the finished leather, and treated with fillers and conditioners such as epsom salts to give body to the leather before mechanical finishing.

It is an object of this invention to provide a method of producing vegetable tanned leather having improved properties.

It is a further object of this invention to provide a method of producing leather having good moisture permeability, perspiration resistance, dimensional stability and temper stability.

It is a further object of this invention to provide a leather particularly suitable for use in shoe insoles.

According to the invention vegetable tanned hides are washed with water to remove substantially all of the uncombined tannins, fat liquored, and treated with an aqueous solution of dimethylol urea at a pH above about 4.4 for a time sufficient to allow substantially complete penetration of the hides by the dimethylol urea and at a pH below about 4.4 for a time sufficient to allow the penetrated dimethylol urea to become affixed to the hides.

The vegetable tanning may be carried out in a conventional manner with vegetable extracts such as wattle or quebracho. In the conventional process excess tannins are removed from the hides by washing with water, but all of the uncombined tannins are not removed and conventional vegetable tanned leather contains about 15% by weight uncombined tannins. According to the process of this invention the washing is carried out to the extent that substantially all of the uncombined tannins are removed from the hides. This is accomplished by continuing the washing until the wash water is water white. It may for example be carried out by drum washing the hides with water at 90° F. for about two hours.

The hides may then be wrung to remove excess wash water before fat liquoring. Fat liquoring may be carried out in drums with conventional fats and oils such as sulfonated animal, vegetable or mineral oils. However, it is usual to use fats and oils in the amount of about 3% by weight of the weight of the wrung hides, and in accordance with the process of this invention it is preferred to carry out the fat liquoring with oils and fats in the amount of about 6% by weight of the weight of the wrung hides.

After the fat liquoring has been completed, it has been found to be advantageous to mechanically finish and dry the hides before treating with the dimethylol urea solution.

The hides are treated with the aqueous solution of dimethylol urea first at a pH above about 4.4 and then at a pH below about 4.4, preferably from about 3.9 to about 4.4. While at the higher pH the dimethylol urea solution penetrates into the hides and when the pH drops to the lower value, the penetrated dimethylol urea will become affixed to the hides. The mechanism of the reaction is not completely understood, but it is believed that the dimethylol urea polmerizes at the lower pH and cross-links with the protein of the hides, the combined tannins and/or the oils and fats added during the fat liquoring step. The removal of the uncombined tannins by washing prevents any side reaction with the uncombined tannins which would interfere with the process. The drying of the hides before treatment with the dimethylol urea solution aids in the process by removing water from the hides which would dilute the dimethylol urea solution.

The pH should be maintained at the higher value for a time sufficient to allow the dimethylol urea to substantially completely penetrate the hides, since, if the pH falls to a value at which the dimethylol urea will polymerize with the hides before complete penetration, it will become affixed to the surface of the hides and interfere with further penetration.

An aqueous solution of dimethylol urea will have a pH of about 6.8 to 7.0, and it will gradually lower upon immersion of the hides due to the acidity of the hides. Vegetable tanned hides normally have a pH of from about 3.0 to 4.0. The pH may be raised or maintained, if necessary, by the addition of a weak base such as an aqueous borax solution, or lowered, if necessary, by the addition of a weak acid such as an aqueous solution of oxalic acid.

In practice it has been found that when using a solution of about 6% by weight dimethylol urea and with about 8 parts by weight of solution to one part by weight of the dried hides, the pH will lower at a rate which will allow substantially complete penetration of the hides by the dimethylol urea solution before the pH drops sufficiently that the dimethylol urea becomes affixed to the hides. Using this solution, a total time of immersion of from about 16 to about 18 hours is sufficient to provide for penetration and affixation of the dimethylol urea. At the end of the immersion, the solution will have a pH of from about 3.9 to about 4.4.

Satisfactory results are obtained using a solution of from about 5.0 to about 7.0% by weight dimethylol urea and about 7 to 9 parts by weight of solution to one part by weight of the dried hides.

The treatment with the solution is preferably carried out at a temperature from about 105 to 122° F., and particularly good results are obtained when the temperature is from about 118 to 120° F.

Upon completion of the immersion, the hides are removed, dried, buffed and cut. The dimethylol urea solution may be adjusted and re-used indefinitely. The solution may be renewed by adding dimethylol urea and water to replace that absorbed by the hides and borax to raise the pH to 6.8 to 7.0.

The product has a high rate and capacity of moisture absorption and has a high degree of perspiration resistance, dimensional stability and temper stability. Because of these properties, the product is particularly suitable for use in insoles for shoes. The absence of fillers such as epsom salts reduces the danger of spew on uppers from the insoles, and the absence of free soluble tannins or colouring materials reduces the danger of staining hose in contact with insoles. The leather may also be used for shoe welting and lining, and when impregnated with butadiene and natural rosins may also be used for shoe outsoles.

The following example illustrates an embodiment of the process of this invention.

EXAMPLE

Greensalted cattle hides were prepared for tanning by washing for 2½ hours with water at a temperature of about 60 to 70° F. and then green-fleshed. The hides were then limed in drums rotating at 4 r.p.m. for 48 hours at a temperature of 90° F. with about two parts by weight of an aqueous solution of 5% calcium hydroxide and 0.075% sodium sulfide to one part by weight of the hides. This was followed by bating in drums rotating at 16 r.p.m. for 1½ hours at a temperature of 90° F. with two parts by weight of an aqueous solution of 1½% ammonium sulphite and ⅛% pure pancreatice bate enzyme to one part by weight and the hides. The bate solution was drained from the drums and the hides were then pickled with two parts by weight of an aqueous pickling solution to one part by weight of the hides. The pickling was carried out in the drums at a temperature of 72° F. by rotating the drums at a speed of 16 r.p.m. for two hours, and then allowing the hides to soak in the solution overnight. The pickling solution contained 10% common salt by weight of the hides and 1.75% sulphuric acid by weight of the hides.

After pickling, the pickling solution was drained from the drums and the hides were pre-tanned by rotating the hides in the drums for two hours at 16 r.p.m. with a 5% by weight solution of a naphthalene sulfonic acid syntan. Then 12½% by weight wattle extract and 12½% by weight quebracho were added and the tanning was completed by rotating the drums at 4 r.p.m. for 16 hours.

The hides were then washed with water for 1½ hours at 90° F. in drums rotating at 4 r.p.m. The wash water was water white at the completion of the washing. After washing the hides were pulled and wrung between rollers to remove excess wash water, and this was followed by fat liquoring in drums rotating at 16 r.p.m. for 1 hour and 15 minutes with 2% by weight of the wrung hides of sulfonated cod oil, 2% by weight of the wrung hides of sulfonated vegetable oil, and 2% by weight of the wrung hides of mineral oil.

After fat liquoring, the hides were machine finished, set out on a setting machine and hung overnight to condition and partially dry. The hides were then hung to dry overnight in a chamber at 120° F.

The immersion in the dimethylol urea solution was carried out by immersing 100 lbs. of dried hides in 800 lbs. of an aqueous solution containing 48 lbs. of dimethylol urea. Prior to immersion the hides had a pH of from about 3.0 to about 4.0 and the dimethylol urea solution had a pH of from about 6.8 to about 7.0. After the hides had been immersed for 16 hours, the pH of the solution had fallen to from about 3.9 to about 4.4.

After immersion, the hides were removed from the bath, hung to dry overnight, buffed and cut. The leather produced had a natural tan colour and a tight fiber and grain, and showed good performance when used in shoe insoles.

The leather produced withstood boiling in water for 3 minutes, whereas the conventional vegetable tanned leathers tested cracked and curled at 175° F. The leather produced was soaked in water for ½ hour, wrapped in aluminum foil and baked in an oven for 168 hours, and was substantially unimpaired. Conventional vegetable tanned leathers cracked and broke down after four hours. These tests illustrate the ability of the product to withstand perspiration when used in shoes.

When immersed in water, the leather produced absorbed 55% moisture in 30 seconds, whereas the conventional vegetable tanned leather tested absorbs only 20% moisture in 30 seconds. The moisture permeability allows the leather to rapidly absorb and disperse perspiration when used as shoe leather. This contributes to the comfort of the wearer by reducing any clamminess or damp feeling inside the shoe.

The leather has improved temper stability and will spring back on bending. This property is important in a shoe leather since it contributes to the shape retention of the shoe.

The leather produced also had good dimensional stability and maintained its full dimensions without any appreciable shrinkage after repeated wetting and drying. Conventional vegetable tanned leathers shrank as much as 10% under the same test conditions.

In the production of conventional vegetable tanned leathers, conditioners such as epsom salts are added to give body, fullness and dry temper. The leather produced in accordance with this invention has these properties without the use of conditioners, and this avoids any problem of spew from the conditioners. The spew is a white substance which deposits on the shoe upper caused by the conditioners from the insole leather dissolving in perpiration from the foot of the wearer and migrating to the upper. No such spew was encountered when the leather produced in accordance with this invention was used on shoe insoles. Also, the absence of free soluble tannins avoids the problem of stains on the hose of the wearer caused by soluble tannins in the insole leather.

What I claim as my invention is:

1. A method of producing leather comprising, washing the vegetable tanned hides with water to remove substantially all of the uncombined tannins, fat liquoring the hides, drying the hides, immersing the hides in an aqueous solution of dimethylol urea containing from about 5.0 to about 7.0% by weight dimethylol urea, at a temperature from about 105 to about 122° F., the immersion being carried out at a pH above about 4.4 for a time sufficient to allow substantially complete penetration of the hides by the dimethylol urea, allowing the pH of the dimethylol urea solution to fall to from about 3.9 to about 4.4 due to the acidity of the hides, and continuing the immersion of the hides in the dimethylol urea solution at a pH from about 3.9 to about 4.4 until the penetrated dimethylol lurea has become affixed to the hides.

2. A method of producing leather comprising washing with water vegetable tanned hides having a pH from about 3.0 to about 4.0 to remove substantially all of the uncombined tannins, fat liquoring the hides, drying the hides, immersing the hides in an aqueous solution of from about 5.0 to about 7.0% by weight dimethylol urea containing from about 7 to about 9 parts by weight dimethylol urea per part by weight of the dried hides, at a temperature from about 105 to about 122° F., for a period of from about 16 to about 18 hours, the solution having an initial pH of from about 6.8 to about 7.0 and being allowed to fall to from about 3.9 to about 4.4 during the immersion as a result of the acidity of the hides.

(References on following page)

References Cited

UNITED STATES PATENTS

| | | | |
|---|---|---|---|
| 1,947,513 | 2/1934 | Bergmann | 8—94.21 |
| 1,975,616 | 10/1934 | Porter. | |
| 2,205,355 | 6/1940 | Grimm et al. | 8—94.21 |

OTHER REFERENCES

Kremen et al.: J. Int. Soc. Lea. Trades Chem., pages 437–442, May 1949.

Luck et al.: Revue Tech. des. Ind. du Cuir., pages 368, 370, 372, 377, 378, 380, 382, 386, 387. 8/94 C.

Wilson: Modern Practice in Leather Manufacture, pages 468–471, 479, 480, 495–501, 505, and 507, pub. 1941 by Reinhold Pub. Corp., New York, N.Y.

DONALD LEVY, Primary Examiner

U.S. Cl. X.R.

8—94.32, 94.23; 117—142.